United States Patent [19]

Kolleth et al.

[11] Patent Number: 4,805,756

[45] Date of Patent: Feb. 21, 1989

[54] LOADING DEVICE, IN PARTICULAR BUCKET-WHEEL EXCAVATOR

[75] Inventors: Horst Kolleth, Zeltweg; Andreas Wieczorek, Leoben, both of Austria

[73] Assignee: Voest-Alpine Aktiengesellschaft, Linz, Austria

[21] Appl. No.: 93,677

[22] Filed: Sep. 8, 1987

[30] Foreign Application Priority Data

Sep. 5, 1986 [AT] Austria .................................. 2396/86

[51] Int. Cl.⁴ .............................................. B65G 65/20
[52] U.S. Cl. .................................. 198/314; 198/307.1; 198/317; 198/318; 198/494; 198/509
[58] Field of Search ..................... 198/304, 307.1, 311, 198/312, 314, 315, 316.1, 317, 318, 319, 320, 509, 508, 510.1, 511, 535, 536, 580, 537, 539, 493, 494–501, 550.3; 414/133

[56] References Cited

U.S. PATENT DOCUMENTS 3,285,385 11/1966 Langner .......................... 198/314 X
3,744,615 7/1973 Plaquet et al. ................ 198/316.1 X
3,828,913 8/1974 Scholler .......................... 198/307.1

Primary Examiner—Robert J. Spar
Assistant Examiner—Lyle Kimms
Attorney, Agent, or Firm—Cushman, Darby & Cushman

[57] ABSTRACT

The bucket-wheel excavator comprises a swivellable bucket-wheel boom 6 and a swivellable bridge 11. At a transfer location, the bridge 11 is rotatably supported on a truncated conical superstructure 10 and the turntable b 16 l of the bridge comprises raking protrusions 17, which clear the surface 18 of the superstructure 10 of debris when swivelling the turntable 16 (FIG. 1).

9 Claims, 2 Drawing Sheets

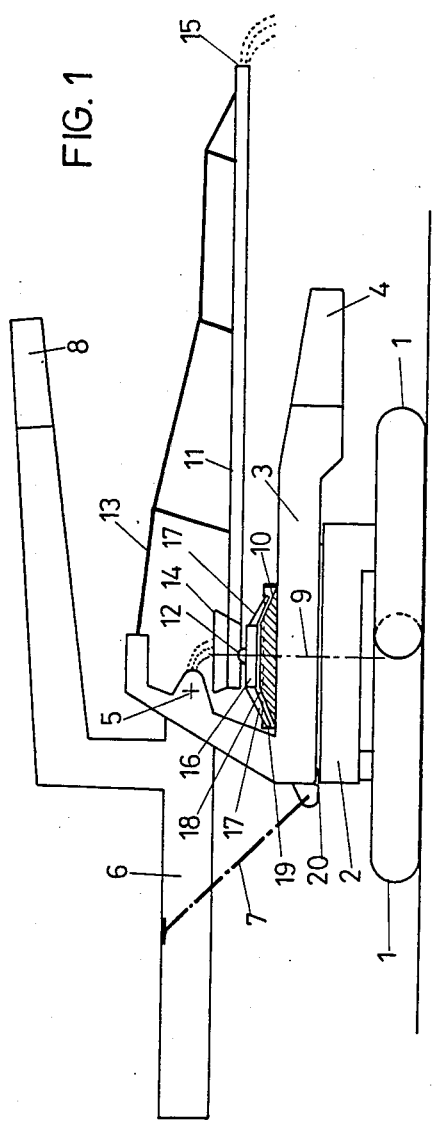
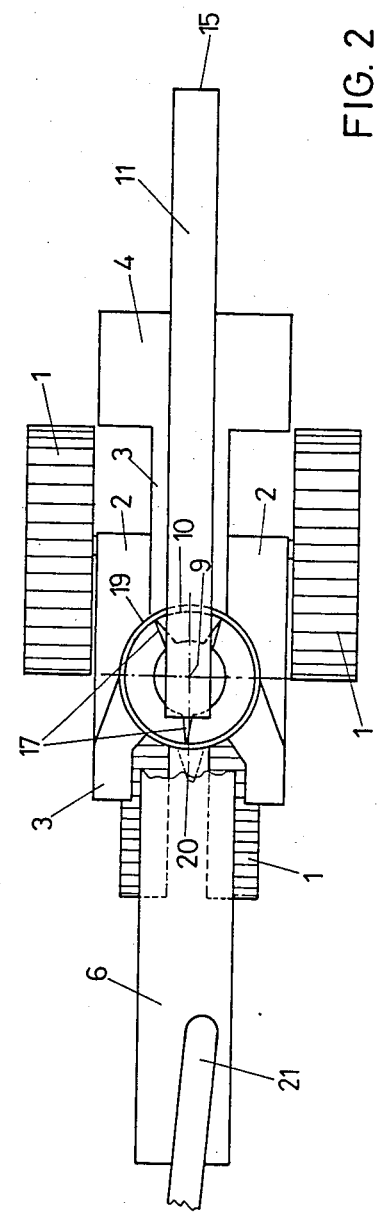

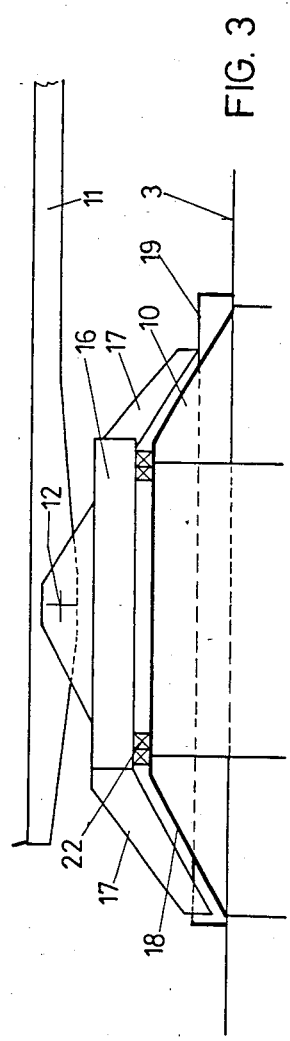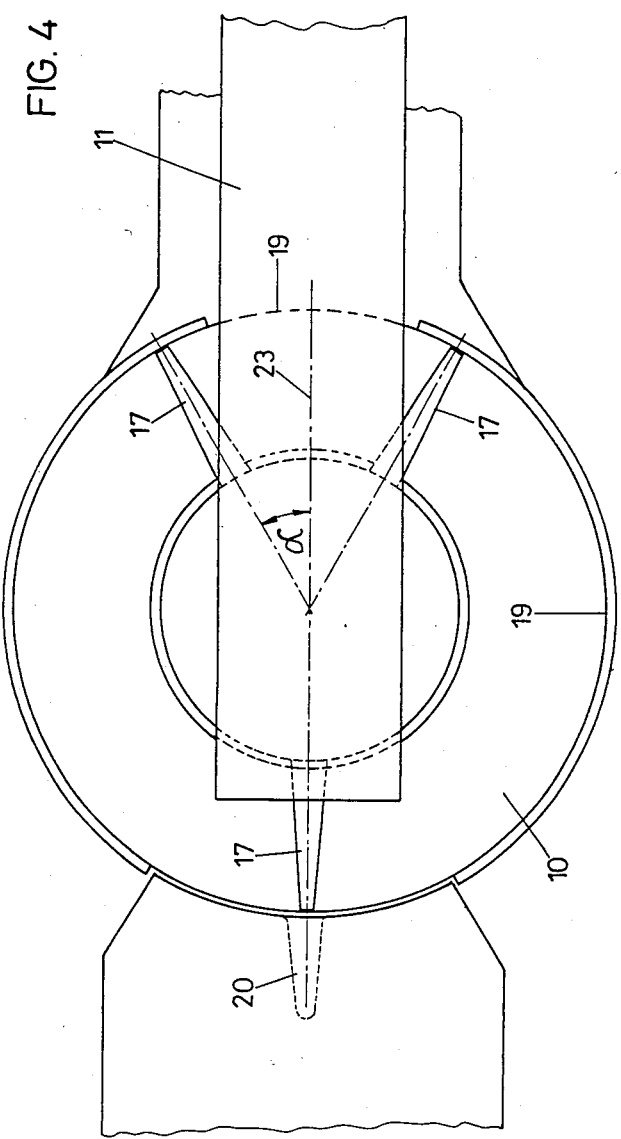

LOADING DEVICE, IN PARTICULAR BUCKET-WHEEL EXCAVATOR

BACKGROUND OF THE INVENTION

1. Field of the Invention

The invention refers to a loading device, in particular bucket-wheel excavator, comprising a cantilever arm carrying tools, in articular a bucket-wheel, and a continuous conveyor means and comprising a bridge including a further continuous conveyor means, in which device the cantilever arm and the bridge are supported on the substructure for being swivellable around substantially vertical axes and the take-up end of the bridge is arranged below the discharge end of the conveyor means of the cantilever arm.

2. Description of the Prior Art

Loading devices of the initially-mentioned type may, for example, be taken from DE-OS No. 33 46 306 and DE-AS No. 28 05 389, both of these known loading devices being designed as bucket-wheel excavators. The conveyor means of the bucket-wheel boom and of the bridge are arranged for being kinked, one relative to the other, and at a transfer location, for transferring the material from the conveyor means, usually being designed as a conveyor belt, of the bucket-wheel boom onto the conveyor belt of the bridge, there is most frequently provided a charging chute for preventing any material from only incompletely arriving on the conveyor means of the bridge at the transfer location. For the purpose of ensuring a substantially complete transfer of the heap of debris, it is required to provide, in dependence of the transported heap of debris, a more or less high charging chute, which results in a great constructional height. The dropping distance shall, of course, be made as small as possible for reducing dust formation. The bucket-wheel boom and the bridge are, in addition to be swivellable around a substantial vertical axis, also swivellable, as a rule, around a substantially horizontal axis and, on account of both booms being movable one relative to the other in vertical and horizontal directions, a charging chute of relatively great dimensions is again required for the purpose of providing a complete transfer of material. Also in case of correspondingly big constructions, it can, however, not be prevented that part of the heap of debris also arrives on the deck of the lower chassis where it represents an obstacle for the relative movements between upper chassis and lower chassis. In particular in case of charging chutes of relatively low height, a relatively great amount of the heap of debris arrives at the platform or, respectively, the substructure, and for the purpose of maintaining manoeuvrability, the heap of debris having arrived at those locations has had to be manually shovelled away.

SUMMARY OF THE INVENTION

The invention now aims at providing a device of the initially-mentioned type, in which manoeuvrability, in particular the swivelling movement of the cantilever arm and, respectively, the bridge, can reliably be maintained also in case of charging chutes of low constructional height. For solving this task, the invention essentially consists in that at least one radially-extending raking protrusion is provided relative to the vertical swivelling axis of the bridge for being swivellable around a vertical axis, which raking protrusion cooperates with the surface of a platform carrying the cantilever arm and/or with the surface of the substructure. On account of at least one such radially-extending raking protrusion being provided, the material having arrived beside the charging chute can be shifted off the underlying platform or substructure, respectively, by swivelling this raking protrusion, so that the swivelling movements of the cantilever arm and of the bridge are not affected whatsoever also in case of a charging chute of low constructional height. In a particularly advantageous manner, the arrangement can, in this case, be selected such that the raking protrusion is connected with the bridge, in particular with a turntable for supporting the bridge. In this manner, any swivelling movement of the bridge simultaneously results in clearing the underlying platform and a stable and simple construction is provided. The material having been shifted off the platform carrying the bucket-wheel boom arrives subsequently onto the substructure, and for the purpose of preventing excessive accumulation of heap of debris also at this location and thus any impairment of the swivellability and, respectively, of the bearing means, the arrangement is advantageously selected such that the platform carrying the cantilever arm carries at least one raking protrusion extending radially relative to the substantially vertically extending swivelling axis of the platform and cooperating with the surface of the substructure.

It is possible to reliably clear the platform of the heap of debris to an extent as great as possible by means of raking protrusions of particularly simple design, if the platform has a truncated conical superstructure on which is supported a turntable of the bridge, and if the raking protrusion is downwardly bent in correspondence to the gradient of the cone surfaces. By means of the truncated conical design of the component part carrying the bearing means for the bridge, shifting-away of the heap of debris by means of the raking protrusions is facilitated on account of the inclined side surfaces and any danger of impairment of the swivellability of the bridge is substantially reduced. In this case, it is of advantage to connect with the turntable of the bridge at least two, in particular three raking protrusions, so that substantial removal of the heap of debris having dropped down laterally is possible also in case of small swivelling angles of the bridge.

For facilitating the removal of part of the heap of debris having dropped down onto the underlying platform, there is advantageously taken care that the heap of debris having been shifted away may only arrive on the substructure at preferred locations. For this purpose, the arrangement preferably selected such that baffle plates are arranged outside of the path of the free ends of the raking protrusions and in concentric relation to the swivelling axis of the raking protrusions, said baffle plates being interrupted in a radial direction. At those locations, at which said baffle plates are interrupted in a radial direction, the raking protrusions can discharge the material and the discharged material thus arrives onto the underlying substructure only at the locations of said interruptions of the baffle plates.

For providing the possibility of utilizing raking protrusions of small design, these raking protrusions are advantageously designed such that they taper in the direction to their free ends and are in particular designed as carrier members of equal strength.

It is possible to reliably strip the material shifted off the platform or, respectively, the superstructure even in case of small swivelling angles of the bridge relative to the longitudinal axis of the chassis, if the arrangement is such that the raking protrusions include an angle between 0° and 45° with the longitudinal axis of the bridge.

BRIEF DESCRIPTION OF THE DRAWING

In the following, the invention is explained in greater detail with reference to examples of embodiment schematically shown in the drawing, in which FIG. 1 shows a schematic side elevation of the bucket-wheel excavator, FIG. 2 shows a schematic top plan view of the embodiment according to FIG. 1, FIG. 3 shows in on enlarged scale the bearing means of the bridge together with the raking protrusions and FIG. 4 shows a top plan view of the embodiment according to FIG. 3.

DETAILED DESCRIPTION OF THE PREFERRED EMBODIMENTS

According to FIG. 1, a substructure 2 is arranged on a caterpillar chassis 1 and carries the bearing means for a platform 3 comprising a ballast boom 4. The platform 3 carries the swivelling axis 5 for the bucket-wheel boom 6 which can be lifted and lowered in height direction and around the swivelling axis 5 by means of a hydraulic cylinder-piston aggregate 7. A counter-weight boom for the bucket-wheel boom 6 is designated by the reference numeral 8. The substantially vertical swivelling axis of the platform 3 is designated by the reference numeral 9.

The platform 3 carries a truncated conical superstructure 10, in its turn carrying the swivelling bearing means for the bridge 11. The bridge 11 is swivellable relative to the truncated conical superstructure 10 around an essentially vertical axis again designated with reference numeral 9. Swivelling movement in height direction may be effected around an axis schematically indicated by the reference numeral 12. The bridge 11 is guyed against the platform by rod means optionally comprising hydraulic cylinder-piston-aggregates or by ropes 13 and carries a charging chute 14 within the area for transferring material from a conveyor means within the bucket-wheel-boom 6 to the conveyor means within the bridge 11. The discharge end of the bridge 11 is designated by the reference numeral 15.

The rotating bearing means of the bridge 11 comprises a turntable 16 having connected thereto downwardly directed raking protrusions 17 cooperating with the lateral cone surfaces 18 of the truncated conical superstructure 10. A baffle plate 19 being interrupted in circumferential direction is provided for laterally delimiting the path of the raking protrusions 17.

Raking protrusions 20 connected with the platform 3 may be provided between the platform 3 and the substructure 2 for removing any material out of the interstice between platform 3 and substructure 2. The baffle plate 19 is, as can in particular be taken from FIG. 2, interrupted in a circumferential direction for enabling directional discharge of material onto the underlying substructure. In FIG. 2, the bucket-wheel is schematically indicated by the reference numeral 21.

The bearing means of the bridge 11 is shown in an enlarged scale in the representation according to FIGS. 3 and 4. The turntable 16 carries the raking protrusion 17 and is supported on the truncated conical superstructure 10 for bearingly supporting the turntable 16 by means of swinging bearings 22. The lateral surfaces 18 of this truncated conical superstructure 10 extend along a cone surface and are swept by the raking protrusion 17 for stripping off from the platform 3, on which the truncated conical superstructure 10 is fixed, any heap of debris having dropped thereon. A baffle plate for discharging the heap of debris at predetermined locations is schematically indicated by the reference numeral 19. From the representation according to FIG. 4 it can be taken that the baffle plate 19 is interrupted in proximity of the longitudinal axis 23 of the chassis so that the heap of debris having arrived at the truncated conical superstructure 10 is stripped-off by the raking protrusions 17 essentially at a central location. The raking protrusions 17 facing the bridge 11 include, with the bridge 11 being oriented in direction of the longitudinal axis of the chassis, with the longitudinal axis 23 of the chassis, an angle of less than 45° for facilitating the discharge at a central location. In this case, the raking protrusion 17 facing the bucket-wheel boom is oriented in parallel relation to said axis 23. In FIG. 4, the raking protrusion 20 connected with the platform 3 and clearing the surface of the substructure 2 is again schematically indicated. The raking protrusion 17 can be connected to the turntable 16 for being swivellable in height direction and thus to better follow any unevennesses of the superstructure 10.

What is claimed is:

1. A bucket-wheel excavator, comprising:
   a substructure;
   a platform mounted on said substructure for swiveling, relative to the substructure, about a substantially vertical axis;
   a bucket-wheel boom cantilevered at a rear end thereof to said platform and carrying a bucket-wheel at a forward end thereof;
   a first continuous conveyor means, provided on said bucket-wheel boom for conveying material received from the bucket-wheel, and spillingly discharging said material off said rear end of said bucket-wheel boom;
   an elongated bridge having a forward end thereof by mounting means onto said platform for swiveling mounted about a substantially vertical axis;
   a second continuous conveyor means, provided on said and having one end positioned for accepting material spillingly discharged off said first continuous conveyor means and a discharge end longitudinally spaced along said bridge from said forward end of said bridge;
   said mounting means including a superstructure fixed on said platform and a turntable connected with said bridge and journalled for rotation on said superstructure;
   said turntable including at least one raking protrusion extending radially in superimposed juxtaposition with a generally upwardly-facing surface of said superstructure, for raking off of said surface of said superstructure, as said turntable turns about said substantially vertical axis, excavated debris which, in spilling from said first continuous conveyor means at said rear end of said bucket-wheel boom, has missed acceptance by said second conveyor means and, instead, fallen onto said superstructure.

2. The bucket-wheel excavator of claim 1, wherein:
   said superstructure is upwardly tapering frustoconical in shape;
   said surface is a tapering circumferentially extending outer peripheral surface of said superstructure; and each said raking protrusion declines radially outwardly and downwardly along said surface.

3. The bucket-wheel excavator of claim 2, wherein: said superstructure further includes a baffle plate extending in a circumferential direction about an outer perimeter of said surface, said baffle plate being upstanding in relation to said surface at said outer perimeter and being interrupted throughout a segment having a selected location, so that debris raked from said superstructure by said at least one raking protrusion is predisposed to spill from said surface where said baffle plate is interrupted.

4. The bucket-wheel excavator of claim 3, wherein: said at least one raking protrusion includes two raking protrusions respectively spaced less than 45 in opposite angular directions from the longitudinal axis of said bridge, and diverge towards said discharge end of said second continuous conveyor means.

5. The bucket-wheel excavator of claim 4, wherein: both of said two raking protrusions taper radially outwardly and have outer ends located near said outer perimeter of said surface.

6. The bucket-wheel excavator of claim 4, wherein: said at least one raking protrusion includes a third raking protrusion extending at least generally aligned with said longitudinal axis of said bridge in a direction away from said discharge end of said second conveyor means.

7. The bucket-wheel excavator of claim 1, wherein: said at least one raking protrusion includes two raking protrusions respectively spaced less than 45° in opposite angular directions from the longitudinal axis of said bridge, and diverge towards said discharge end of said second continuous conveyor means.

8. The bucket-wheel excavator of claim 7, wherein: said at least one raking protrusion includes a third raking protrusion extending at least generally aligned with said longitudinal axis of said bridge in a direction away from said discharge end of said second conveyor means.

9. The bucket-wheel excavator of claim 9, wherein: said platform includes at least one further raking protrusion arranged to extend radially in superimposed juxtaposition with a generally upwardly-facing surface of said substructure, for raking debris off of said substructure surface as said platform rotates about said substantially vertical axis relative to said substructure.

* * * * *